United States Patent [19]

Reichardt et al.

[11] Patent Number: 4,814,593

[45] Date of Patent: Mar. 21, 1989

[54] CHIP-CARD CONTACTING APPARATUS HAVING CARD SECURING MEANS

[75] Inventors: Manfred Reichardt, Weinsberg; Eberhard Raab, Heilbronn, both of Fed. Rep. of Germany

[73] Assignee: Amphenol Corporation, Wallingford, Conn.

[21] Appl. No.: 75,942

[22] Filed: Jul. 22, 1987

[30] Foreign Application Priority Data

Jul. 25, 1986 [DE] Fed. Rep. of Germany ....... 3625306

[51] Int. Cl.$^4$ .......................... G06K 7/04; H01R 13/62
[52] U.S. Cl. ................................... 235/482; 235/483; 235/486; 439/260; 439/267
[58] Field of Search ............... 235/492, 475, 476, 479, 235/482, 483, 486, 436, 441; 439/260, 266, 267, 152

[56] References Cited

U.S. PATENT DOCUMENTS

| | | | |
|---|---|---|---|
| 3,806,707 | 4/1974 | White et al. ................. | 235/479 X |
| 4,081,131 | 3/1978 | Sand et al. ................. | 235/479 |
| 4,724,310 | 2/1988 | Shimamura et al. ......... | 235/486 |
| 4,734,567 | 3/1988 | Hansbauer ................. | 235/482 |
| 4,735,578 | 4/1988 | Reichardt et al. .......... | 439/152 |
| 4,752,234 | 6/1988 | Reichardt et al. .......... | 439/260 |

FOREIGN PATENT DOCUMENTS 3145705 5/1983 Fed. Rep. of Germany .

Primary Examiner—Philip H. Leung
Attorney, Agent, or Firm—Bacon & Thomas

[57] ABSTRACT

A contacting apparatus for a chip-card is provided. The contacting apparatus can be located for instance in an automatic teller machine or a telephone. The chip-card can be inserted into the contacting apparatus by an operator. If the chip-card is located in the contacting apparatus, the inadvertent removal of a card located in a card reading position might be undesirable. The contacting apparatus of the invention protects against such inadvertent removal of the card by including a protective collar which surrounds the end of the chip-card extending out of the contacting apparatus, or device within which the contacting apparatus is arranged, when the card is in its reading position.

7 Claims, 5 Drawing Sheets

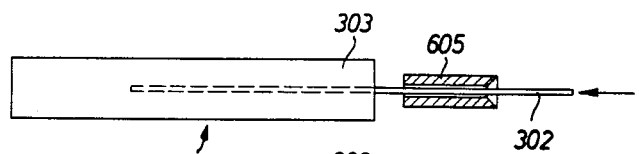
Fig. 8a
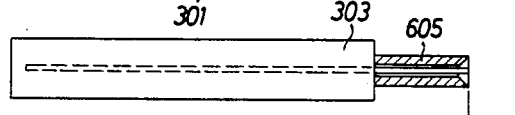
8b
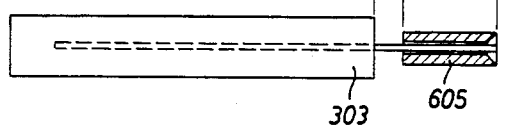
8c
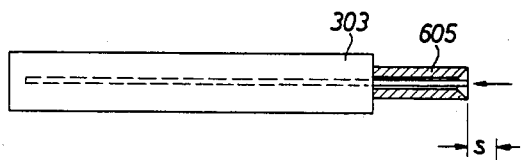
8d
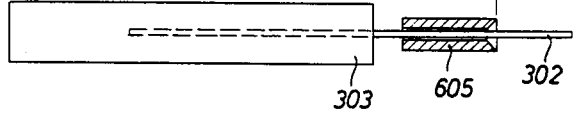
8e

CHIP-CARD CONTACTING APPARATUS HAVING CARD SECURING MEANS

DESCRIPTION

1. Technical Field

This invention relates generally to an apparatus for contacting a chip-card, and more particularly to securing means assigned to said contacting apparatus for securing the chip-card in said contacting apparatus against an inadvertent removal of said card. The invention relates particularly to card securing means for a contacting apparatus for contacting (i.e. allowing the reading of information in the chip of the card) a chip-card wherein the chip-card is inserted into and removed from said contacting apparatus by pushing against the card, similar to the actuation of ball point pen, i.e., the following kind of actuation movement: the card is inserted into the contacting apparatus by pushing against the card in a direction of insertion (insert direction), and the card is removed from said contacting apparatus by pushing again against said card in said insert direction.

2. Background Art

It is already known to provide contacting apparatus for a chip-card in such a manner that the chip-card after being inserted into the contacting apparatus, i.e. after being located in its reading position, is no longer accessible by the operator of the contacting apparatus. For a removal of the card either a locking means has to be released or, in another design, ejecting means have to be actuated. Said locking means or ejecting means can either be operated manually or electromagnetically.

In other contacting apparatus for a chip-card, the card projects out of the machine or device within which the contacting apparatus is located, even if the card is inserted into said contacting apparatus and is located in its reading position. The reason is that the chip-card is also used as an actuating member. For inserting the card into the contacting apparatus, the card is pushed into that contacting apparatus up until an abutment means is encountered by the card and the reading position is reached. Different methods are known to remove the chip-card from such contacting apparatus. For such contacting apparatus being on the market and used in France, the card can be removed from its reading position in the card contacting apparatus by simply pulling it out of the contacting apparatus. In West Germany contacting apparatus are in use according to which the card, which has been pushed into its reading position, is released by pushing once more against the card in the direction of insertion. This "once more" push releases the card from its reading position and moves the card into a card removal position. As already mentioned above, the movements occuring during such a kind of operation are similar to the operation of the well-known mechanics of a ball point pen where for the actuation of the pen tip from a rest position to a writing position an actuating knob at the end of the pen opposite to the tip is pushed into the pen to bring the tip into its writing position, and where another push against said button will remove the tip from its writing position and bring the button back into its rest position. German Pat. No. 31 45 705 discloses card securing means comprising a pivotally mounted lever which is moved in response to the movement of an information head.

It is an object of the present invention to provide card securing means for a contacting apparatus in such a manner that it can be easily activated and de-activated.

In accordance with another object of the present invention a card securing means is provided which is particularly useful for a contacting apparatus of the type where the chip-card is inserted and removed into the apparatus by pushing against the chip-card.

It is a still further object of the present invention to provide a contacting apparatus for a chip-card with a card securing means such that the card in its reading position is secured against inadvertent removal, but can be readily removed by applying a pushing force against the card.

Generally, the present invention is directed to overcome one or more of the problems of the prior art.

DISCLOSURE OF THE INVENTION

In one aspect of the present invention a contacting apparatus for a chip-card is provided with card securing means comprising a protective collar means surrounding one end of the chip-card in such a manner that it cannot be withdrawn from the contacting apparatus when the card is located in the reading position.

In another aspect of the invention card securing means are provided which protect the chip card located in a contacting apparatus against inadvertent removal from said apparatus.

Preferred embodiments of the invention are disclosed in the dependent claims.

BRIEF DESCRIPTION OF THE DRAWINGS

For a better understanding of the present invention, reference may be made to the accompanying drawings, in which:

FIGS. 8a–8e show schematically the operation of the card securing means of the invention.

Figure 1:
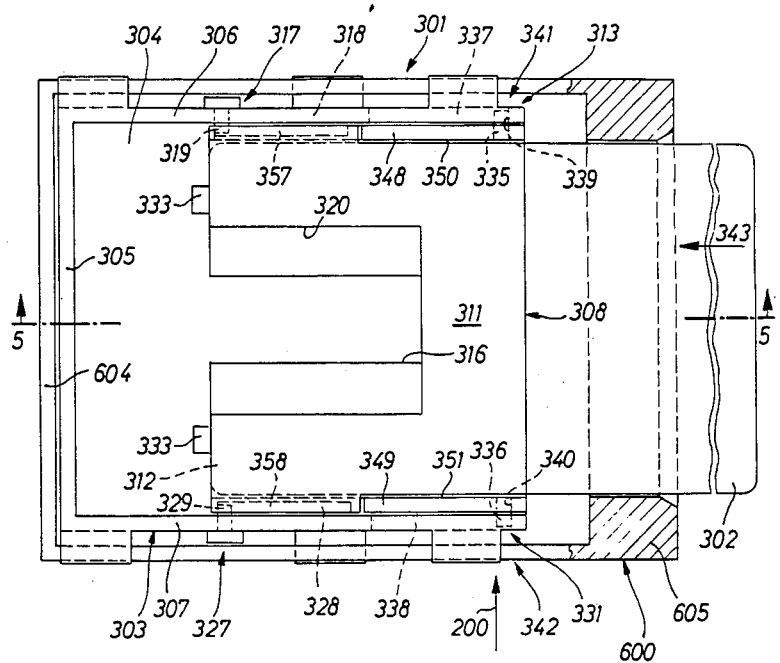
FIG. 1 is a schematic plan view of a contacting apparatus of the invention having card securing means with the card being located in its card insert position, and wherein, for reasons of clarity, the set of contact elements is not shown inserted into said apparatus.

The following description is devoted to an embodiment of a contacting apparatus 301 for a chip-card 302. The chip-card 302 can be moved between a card insert position (also called: card removal position) ad a card reading position (also called: card contact position).

The contacting apparatus 301 (see FIGS. 1 to 7) comprises a housing 303 by means of which the apparatus 301 is located in some kind of machine, for instance, in a telephone apparatus or in an automatic teller machine. Such a machine is schematically represented in FIG. 2 and referred to by reference numeral 321.

Figure 2:
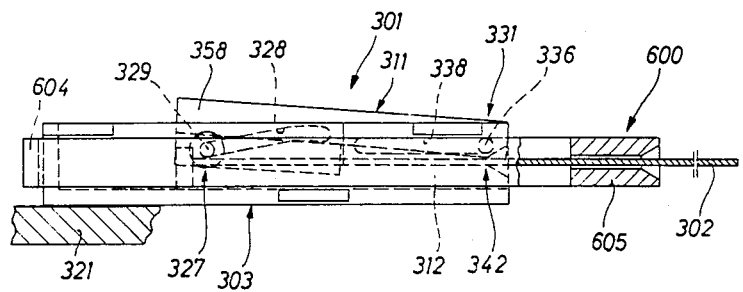
FIG. 2 is a view of the contacting apparatus of FIG. 1 seen in the direction of arrow 200 in FIG. 1.
Figure 3:
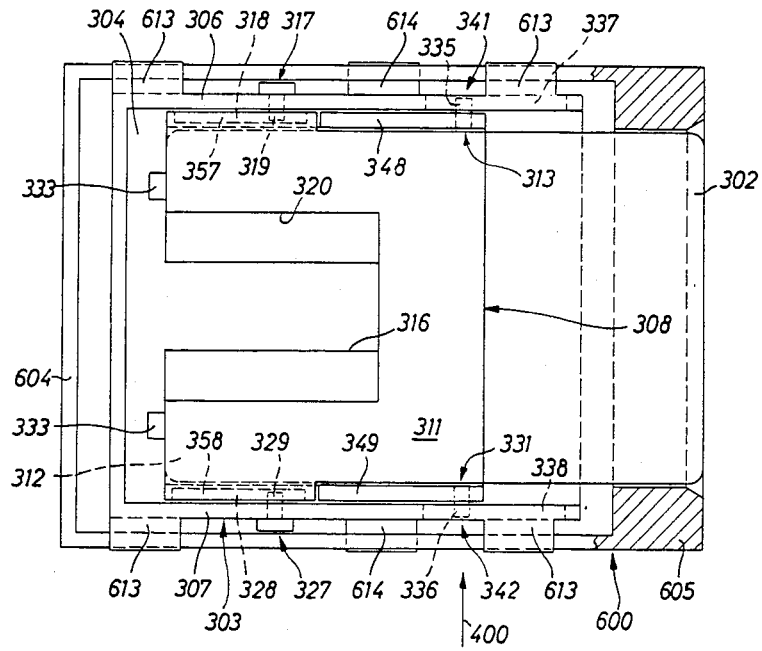
FIG. 3 is a plan view similar to FIG. 1 with the card being inserted into it reading position and the contacting apparatus therefore being in its card contact position.
Figure 4:
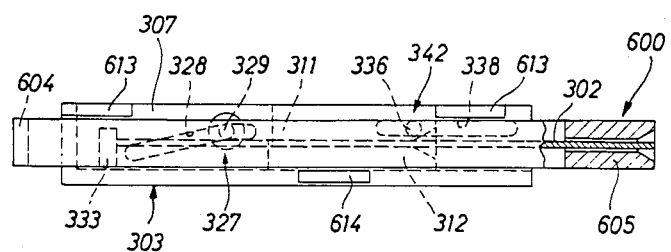
FIG. 4 is a side elevational view of the contacting apparatus of FIG. 3 seen in the direction of arrow 400 in FIG. 3.

Referring now specifically to FIGS. 1-6 it will be recognized that card receiving means (also called card guide means or card support means) 308 are reciprocally mounted within said housing 303. FIG. 1 shows the card receiving means 308 (as well as the card itself) in a first position, the card insert position. As will be gathered from the following description, said card insert position is identical with the card removal position. FIG. 3 shows the card receiving means 308 (as well as the card) in its second or card reading position (also called the card contact position).

So as to simplify the understanding of the following description a short summary of the operation of the contacting apparatus 301 of the invention will be given at this early stage of the description. Initially, chip-card 302 is inserted into the card receiving means 301 into the position shown in FIG. 1 practically without encountering any resistance up until abutment means (abutments 333 yet to be described) stop the unimpeded insert movement of the card 302. If the operator of the contacting apparatus 301 increases thereupon his pushing force exerted onto the one or front edge of the card 302, the movement of the card will continue and the card will now carry along said card receiving means. Consequently, the card receiving means 308 will be moved with respect to the housing 303 from the card insert position shown in FIG. 1 into the card reading position shown in FIG. 3. During said movement of the card receiving means 308 contact elements 361 shown for instance in FIG. 5, and yet to be described, will be caused to contact the card 302 in an area where chip card termination contacts are located (see FIG. 6).

The chip-card 302 together with the card receiving means 308 remains locked in said card reading position up until the operator pushes again against the front edge of the card 302 projecting beyond the card receiving means 308 and simultaneously against protective collar 605 of card securing means 600. Said protective collar means 605 provide protection against unintentionally pulling the chip card 302, located in its reading position, out of the card receiving means 308. The card in its reading position projects out of the card receiving means 308 but is protected by said securing means, i.e. the protective collar means 605. To bring the card (and the card receiving means) back to the card insert/removal position the following has to be done. By pressing against the front edge of the chip-card and the protective collar means 605 in the direction of insertion of the card, the locking of the card receiving means 308 in the card reading position is released with the consequence that the card receiving means 308 "jumps" into the card removal position (which corresponds to the card insert position) shown in FIG. 1 due to the action of spring means. As soon as the card is in the card removal position, it can be easily and readily pulled out of the card receiving means 308, because card 302 now projects beyond the protective collar means 605 as will be described in detail below.

Returning now to the description of the structural components it will be noted that the contact apparatus 301 comprises an upper member, also called a contact element set support (i.e. a support for the set of contact elements) 311, and a bottom member, also called an ejector means 312. The support 311 and the ejector means 312 are coupled with each other in such a manner that they can carry out a common movement between the card insert position and the card reading position. Further, effecting means are provided which are adapted to effect a relative pivotal movement between the support 311 and the ejector 312 in such a manner that the support 311 will bring the set 309 of contact elements with its contact elements 361 into contact with the chip-card 302.

Guide means 341 and 342 are provided to guide the card receiving means 308 during its movement between the card insert position and the card reading position. Moreover, pivotal means 317, 327 are provided to allow for a pivotal movement of the support 311 with respect to the ejector means 312.

Housing 303 comprises a bottom wall 304. A back wall 305 and two side walls 306 and 307 extend upwardly (with respect to the plane of FIG. 1) from said bottom wall 304 in a generally horsehoe-like shape. The upper (see FIG. 1) side wall will be referred to as the first side wall 306 and the lower (see FIG. 2) side wall will be referred to as the second side wall 307. The arrow 343 in FIG. 1 refers to the direction of insertion of the chip-card 302. The guidance of the car support means 308 during the translatory movement is provided by slots 337 and 338. Said slots 337 and 338 extend preferably parallel to the upper surface of said bottom wall 304. Further, pins 319 and 329, respectively, extend through said side walls 306 and 307, respectively, and are operatively connected with said card support means 308.

The contact element support 311 and the ejector means 312 are pivotally connected by means of pivot bearing means 313 and 331. Each of said pivot bearing means 313 and 331, respectively, comprise a bearing pin 335 and 336, respectively, provided at the contact element support 311. The bearing pins 335 and 336 are located in corresponding recesses 339 and 340, respectively, of the ejector means 312. Further, said bearing pins 335 and 336 extend into the appropriate slots 337 and 338, respectively, and contribute to the formation of said guide means 341 and 342.

The ejector 312 comprises a bottom wall 347 abutment means 333 projecting upwardly (see FIG. 5) from said bottom wall 347. Adjacent to said side walls 306 and 307, respectively, guide walls 348 and 349, respectively, extend upwardly with respect to said bottom wall 347. It should be noted that the recesses 339 and 340 already mentioned are provided in said guide walls 348 and 349, respectively. Said guide walls 348 and 349 extend approximately one half the length of the card support means 308 in the insert direction starting from the side where the card 302 can be inserted.

The contact element support 311 forms guide walls 357 and 358, respectively, which are in alignment with and adjacent to said guide walls 348 and 349, respectively. For all practical purposes, the guide walls 348 and 349, respectively, are located in recesses 350 and 351, respectively, of the contact element support 311. The card 302 is laterally guided in the frontal or insert area by means of said ejector means 312, and in the rear area of the insert direction by contact element support 311.

So as to cause a pivotal movement of the contact element support 311 towards the ejector means 312 when the card support means 308 is moved from the card insert position into the card reading position, the pins 319 and 329 extend into the guide slots 318 and 328 provided in said guide walls 357 and 358, such that the desired pivotal movement is automatically effected due to the movement of the card support means 308 in the direction of arrow 343.

Figure 5:
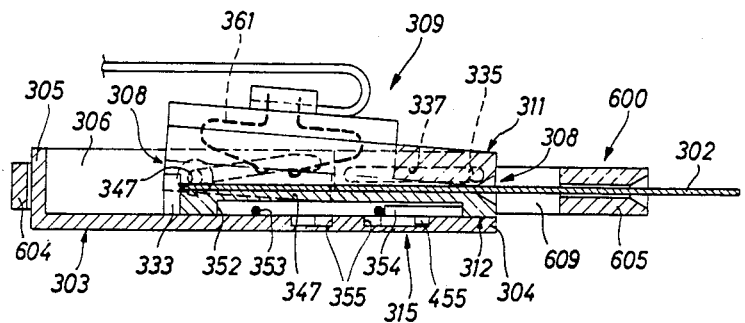
FIG. 5 is a sectional view along line 5—5 in FIG. 1 with the scale being somewhat reduced with regard to FIG. 1 and with a set of contact elements being shown as inserted into the apparatus.
Figure 6:
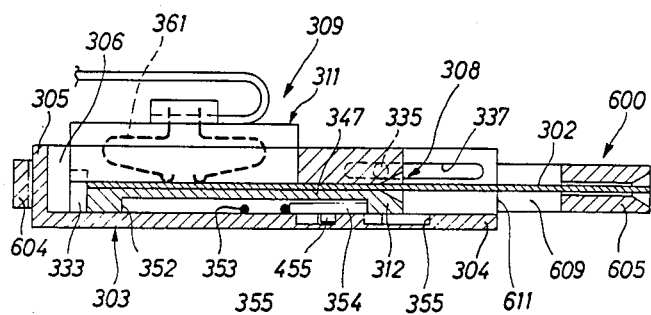
FIG. 6 is a sectional view along line 6—6 in FIG. 3, again on a somewhat reduced scale and again with an inserted set of contact elements.

The bottom surface of the bottom wall 347 is provided with a recess 352 such taht a spring 353 and a guide disc 354 can be housed within said recess 352. The guide disc 354 is centrally provided with a pin 455. Said pin 455 projects into a heart-shaped groove (guide recess) 355 provided in the upper surface of the bottom wall 304. A detent mechanism 315 is shown in FIGS. 5–7 and will be discussed in some detail below.

The detent mechanism 315 allows for a movement of the card support means 308, a movement which is similar to the movement used in a so-called push button pencil or push button ball point pen. This means that the movement of the card support means 308 occurs against the force of spring means (spring 353), i.e. out of the card insert position in the direction of arrow 343. The card insert position is shown in FIG. 7 in the upper half of the drawing. The bottom half of FIG. 7 shows the card reading position. During the above-mentioned movement from the card insert position into the card reading position, the card support means 308 is initially guided by the guide recess 355 beyond the card reading position up until the guide pin 356 contacts guide member 359 of the guide recess 355, and falls then back into a detent recess 363 of a guide member 364. This position is shown in FIG. 7 by line 501. The movement from line 501 to line 500 occurs due to a pushing action against card 302 which is now protected by means of card securing means 600. The movement of the guide pin 354 out of said detent recess 363, and consequently the movement of the card support means 308 from the reading or detent position into the card insert/removal position, is initiated when pressing against the edge of the card which projects in a direction opposite to the insert direction 343. When an operator presses against said card edge, pin 455 will leave the detent recess 363 and is guided by an oppositely located guide nose into a guide member 365, from where the pin 455 will move together with the guide disc 354 along a guide path of the guide recess 355 back into the position shown in the right part of FIG. 7. During said movement the ejector means 312 is carried along by means of the guide disc 354 due to the action of spring 353. As is shown at 366, spring 353 is mounted in the recess 352 of the ejector means 312 in a suitable manner.

Figure 7:
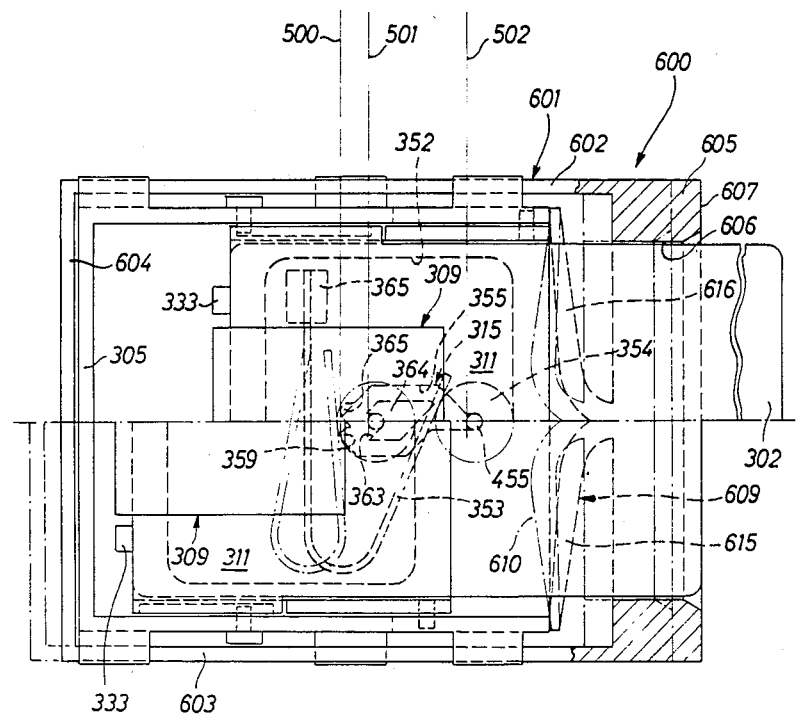
FIG. 7 is a schematic plan view onto the housing of the contact apparatus, wherein in the upper part of FIG. 7 the chip-card is located in the card insert position, while the lower part shows the card in the card contact or card reading position.

The card insert position is shown in FIG. 7 by line 502.

In accordance with the invention the above-mentioned card securing means 600 is provided and will now be described in some detail. In this context, please see FIGS. 1 and 2, Figs. 3–6 and specifically FIG. 7.

The card securing means 600 is adapted to prevent the inadvertent removal of the chip-card 302 out of the card reading position within the contacting apparatus 301. Such an inadvertent removal of the chip-card might cause its destruction. The present invention is particularly useful in connection with a chip-card reading or contacting apparatus of the type shown in German Offenlegungsschrift P 36 02 668.9. Such a contacting apparatus uses—as mentioned above—the so-called ball point pen principle, i.e. a movement similar to the actuation of a ball point pen for bringing the pen tip from a rest position into a writing position and visa-versa. In the case of such a contacting apparatus the chip-card is moved on the same principle from the card insert position into the card reading position and visa-versa by pushing against the edge of the card which projects out of the contactin. apparatus.

Specifically in the contacting apparatus of the above German laid-open application a problem occurs in so far as the card located in its reading position projects out of the device in which the contacting apparatus is located or, more specifically, out of the card receiving means 308, so that it can easily happen that the card is inadvertently pulled out of the apparatus. This can cause damage to the card as well as to the contacting apparatus.

The card securing means 600 of the invention prevent such an inadvertent removal of the card, as long as the card is in its reading position. In accordance with the invention the card securing means 600 comprise a protective collar means 605 having a collar opening 606. Said collar securing means 606 is arranged in alignment with a card receiving opening of the contact apparatus 301. The card securing means 600, specifically the protective collar 605 are movably supported on guide means 601, preferably at the contacting apparatus 301. The card securing means 600 are biased into the protective or rest position shown in FIG. 7 by means of spring means 609. This position is also shown in FIGS. 8a, c, and e, while FIGS. 8b and 8i d schematically represent the card securing means in a moved position. In accordance with the shown preferred embodiment of the inventon the guide means 601 comprise legs 602 and 603 connected by a leg 604 and also connected by said protective collar 605. Said legs 602 and 603 are arranged sideways with respect to the card support means. The protective collar 605 and the legs 602 through 604 are preferably integrally formed of a plastic material, as is shown. For guiding the legs 602 and 603 along the contacting apparatus 301, the side walls 306 and 307 are designed with guide elements 613 and 164 as is shown specifically in FIG. 2. Due to the elasticity of the plastic material the legs 602 and 603 are elastically recieved by the guide pass which are formed in the guide elements 613 and 614 on both sides.

In accordance with the invention it is prefered that said spring means 609 are also integrally formed together with the collar 605 as is shown in FIG. 7. Said spring means 609 comprise two spring arms 615 and 616. The spring arms 615 and 616 abut against abument edges 611 provided at the two side walls 306 and 307 in the lower area of the contacting apparatus. It is clear that the abutment or support for the two spring arms 165 and 616 occurs in such a manner—see again FIG. 6—that no obstacle is caused with regard to the insertion of the card 302. If the chip-card is moved into the contacting apparatus 301, as is shown in the bottom part of FIG. 7, then the spring arms 615 and 616 are bent relatively significantly, as is shown by reference numeral 610. The spring arms will then partially extend into the area of the contacting apparatus 301. The design of the spring means 609 in the manner shown provides for a sufficient spring force, i. e. the force of the spring means 609 is sufficient, after the pressure of the operator against the edge of the card and the protective cover 605 is removed, to bring the protective collar 605 into its rest position protecting the card, while said card is in the reading position. FIGS. 8a–8c show the insertion of the card and FIGS. 8d and 8e show the removal of the card. The arrow in FIG. 8a points out that the user or operator will initially insert the card into the contacting apparatus 301. FIG. 8b shows that the card is moved together with the protective collar 605 along a distance called the "release distance s", i.e. for all practical purposes the movement occurs beyond the card reading position. FIG. 8c shows the card in its reading position and the protective collar 605 in its protective or rest position, i. e. a position were the collar 605 provides protection for the card with regard to an unintentional removal of the card. So as to be able to remove the card, it is necessary to push against the protective collar 605 and the card arranged in the position shown in FIG. 8c. This pushing action is carried out so far that the position shown in FIG. 8d is assumed by the card and the protective collar 605. As soon as the pushing force is removed from card and protective collar in the position of FIG. 8d, for instance, by removing the operator's thumb, then the protective collar will return into its rest position as shown in FIG. 8e, i.e. a position where the collar 605 no longer provides any protective function. In fact, as shown in FIG. 8e, the chip-card 302 is moved out of the protective area of the protective collar 605 and the user or operator can remove the card.

We claim:

1. A contacting apparatus for a chip-card, said apparatus comprising:

a housing, a card support means, reciprocally mounted within said housing and adapted to receive said chip-card, wherein said card support means is movable between a card insert position and a card reading position, locking means adapted to lock said card support means in said reading position and to permit said chip-card and card support means to be removed from the locked reading position by pushing against said card support means, such that the locking means is released and the card support means is returned to the card insert position, and card securing means providing protection for the chip-card located in the card reading position such that the chip-card cannot be pulled from said support means when in the card reading position.

2. The apparatus of claim 1, wherein said card securing means comprises a protective collar, said collar being adapted to surround the end of the card which extends out of the contacting apparatus, or the device within which the contacting apparatus is arranged, when the card is in its reading position, thereby preventing the card from being pulled from said support means.

3. The apparatus of claim 2, wherein spring means are provided adapted to bias said card securing means into a position protecting the projecting end of the card.

4. The apparatus of claim 3, wherein the protective collar is movable against the force of said spring means relative to said contacting apparatus, and can be moved by the same distance as the chip-card and the chip-card support when releasing said locking means.

5. The apparatus of claim 2, wherein the protective collar is arranged in such a manner that the projecting end of the chip-card located in its reading position is completely surrounded by said protective collar, and wherein during movement of the chip-card together with the card support means into the reading position firstly a movement occurs along the entire distance required to release the locking means, and secondly an opposite movement occurs into the reading position.

6. The apparatus of claim 5, wherein for a release movement of the card support means and the card from the reading position back to the insert or removal position a pushing action is applied to the front edge and/or the front side of the protective collar, so that card and collar carry out together the release movement.

7. The apparatus of claim 1, wherein guide means are provided at the housing for the card securing means.

* * * * *